United States Patent [19]

Eguchi et al.

[11] 4,339,334
[45] Jul. 13, 1982

[54] TUBULAR MEMBRANE SEPARATION APPARATUS END JOINT SEAL

[75] Inventors: Tamiyuki Eguchi; Michinobu Izumi, both of Kobe, Japan

[73] Assignee: Kanegafuchi Kagaku Kogyo Kabushiki Kaisha, Osaka, Japan

[21] Appl. No.: 195,006

[22] PCT Filed: Jul. 26, 1979

[86] PCT No.: PCT/JP79/00197

§ 371 Date: Mar. 28, 1980

§ 102(e) Date: Feb. 15, 1980

[87] PCT Pub. No.: WO80/00309

PCT Pub. Date: Mar. 6, 1980

[30] Foreign Application Priority Data

Jul. 28, 1978 [JP] Japan .................................. 53-92699

[51] Int. Cl.³ ............................................. B01D 31/00
[52] U.S. Cl. .................................. 210/433.2; 210/445; 210/450; 210/453
[58] Field of Search .......................... 210/321.1–321.5, 210/323.2, 350, 351, 433.2, 433 M, 445, 450, 451, 452, 453, 455; 55/158; 422/48; 285/55, 334.5, 354, 369, 417; 277/110, 111

[56] References Cited

U.S. PATENT DOCUMENTS

| | | | |
|---|---|---|---|
| 3,446,359 | 5/1969 | Loeb et al. .................. | 210/321.1 X |
| 3,480,147 | 11/1969 | Kanyok ......................... | 210/321.1 |
| 3,581,900 | 6/1971 | Clark ............................. | 210/321.1 |
| 3,768,660 | 10/1973 | Block ........................... | 210/321.1 |
| 3,784,470 | 1/1974 | Richardson et al. ......... | 210/321.1 |
| 3,974,068 | 8/1976 | Ebner et al. .................. | 210/321.1 X |

FOREIGN PATENT DOCUMENTS

7505931[U] 6/1975 Fed. Rep. of Germany ... 210/321.1

*Primary Examiner*—Charles N. Hart
*Assistant Examiner*—David R. Sadowski
*Attorney, Agent, or Firm*—Armstrong, Nikaido, Marmelstein & Kubovcik

[57] ABSTRACT

The invention provides a tubular membrane separation apparatus useful for ultrafiltration and reverse osmosis. A tubular separation element (1) is fitted in a porous pressure-resistant tube (2) which is inserted in a liquid collector tube (3) of larger diameter. The collector tube (3) is detachably connected to connector tubes (6) by joints (4). Each end of the separation element (1) is held between the inner surface of the joint (4) and the end of the connector tube (6) and thereby sealed. The separation element (1) is replaceable, and the apparatus can be disassembled for cleaning.

5 Claims, 6 Drawing Figures

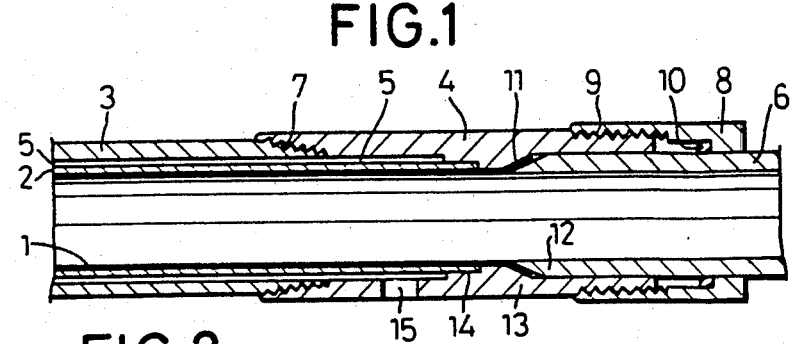
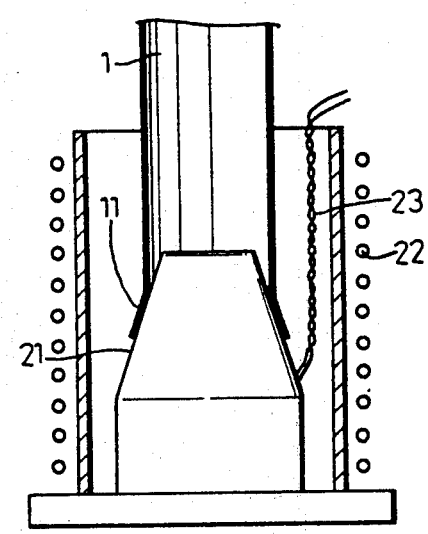
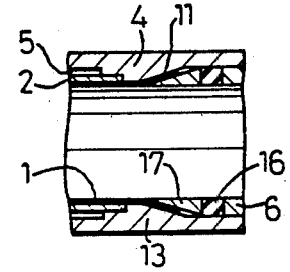
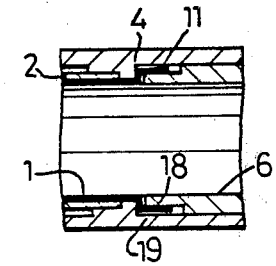
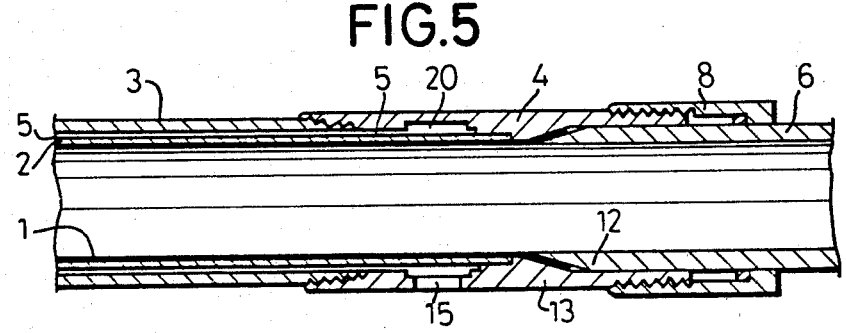

TUBULAR MEMBRANE SEPARATION APPARATUS END JOINT SEAL

TECHNICAL FIELD

This invention relates to a tubular membrane separation apparatus for the ultrafiltration or reverse osmosis of solutions.

BACKGROUND ART

Various tubular membrane separation apparatus are already known. Many of these apparatuses are not provided with a liquid collector tube for the separation element, or include a plurality of separation elements which are housed in a single liquid collector tube. There are a few separation apparatuses in which each liquid collector tube houses a single separation element and the components are separable for cleaning and can be reassembled. Published Examined Japanese patent application Sho No. 52-37994 discloses a separation apparatus comprising a tubular support member having a large number of pores in its peripheral wall and accommodating a tubular semipermeable membrane in its interior. This apparatus includes a gasket of special shape and involves the problem of necessitating a special tool and skill for the removal and installation of the tubular semipermeable membrane.

Other separation apparatuses also have problems. The semipermeable membrane is inconvenient or costly to replace since the separation element is joined to an expensive porous pressure-resistant tube. When not separable into individual parts, the apparatus can not be cleaned and is liable to have sanitation troubles. Gaskets of special shape, if used for securing the liquid collector tube, support member and separation element, render the apparatus costly.

DISCLOSURE OF INVENTION

According to this invention, a tubular separation element comprising a porous backing member and a semipermeable membrane formed over the inner surface of the member is fitted in a porous pressure-resistant tube which is inserted in a liquid collector tube having an inside diameter slightly larger than the outside diameter of the pressure-resistant tube. A joint member is detachably attached at its one end to each end of the collector tube as by screw-thread engagement therewith. The end of the porous pressure-resistant tube is held in contact with an interior bearing face of the joint member. A narrow liquid passage is formed between the collector tube and the pressure-resistant tube. The joint member has an outlet bore through which the liquid passage is in communication with the outside. The liquid filtered by the separation element and flowing through the passage is run off via the outlet bore.

The separation element has a slightly enlarged open end within the joint member. A connector tube extends into the joint member through the other end thereof toward the enlarged end of the separation element and holds the enlarged end between the joint member and the forward end of the connector tube to prevent the leakage of liquid.

Since the separation apparatus of this invention is assembled from detachable components, the apparatus can be assembled or disassembled without necessitating the use of any special tool or skill. The semipermeable membrane is replaceable merely by replacing the separation element which is inexpensive. This is much more economical than the replacement of the combination of the membrane and the pressure-resistant tube conventionally needed.

Additionally the separation element can be sealed by the joint member and the connector tube which hold the enlarged end of the element therebetween, hence sanitary. Thus overcoming the problems encountered with the conventional tubular separation apparatus, the invention assures various outstanding advantages.

BRIEF DESCRIPTION OF THE DRAWINGS

FIG. 1 is a sectional view showing a tubular separation apparatus embodying the present invention;

FIG. 2 is a sectional view of a device for diametrically enlarging the end of a separation element to show how the end is enlarged;

FIGS. 3 and 4 are sectional views showing other embodiments of the means for holding the end of the separation element;

FIG. 5 is a sectional view showing another embodiment of the tubular separation apparatus of this invention.

BEST MODE OF CARRYING OUT THE INVENTION

Figure 6:
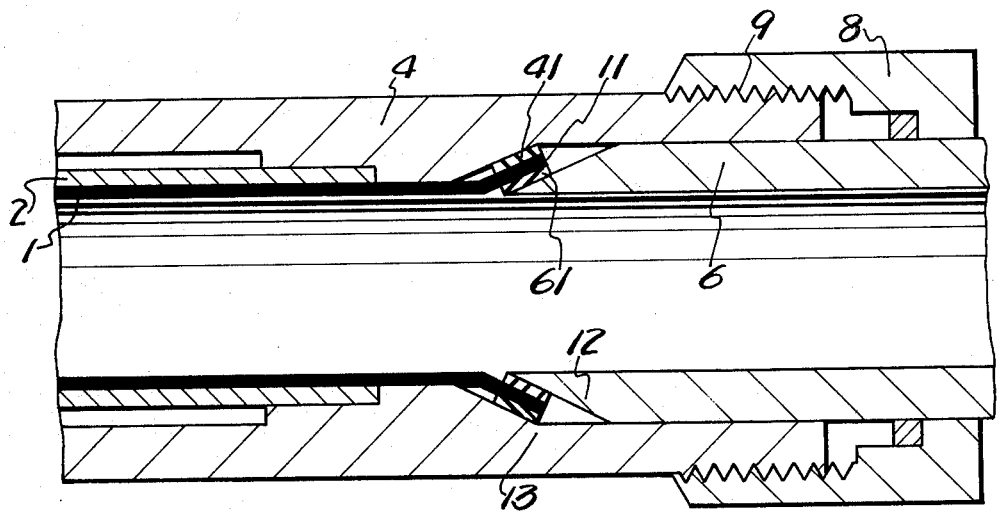
FIG. 6 is a sectional view showing a further embodiment of this invention.

A tubular separation element 1 is fitted in a porous pressure resistant tube 2 which is inserted in a liquid collector tube 3. Six to fourteen such collector tubes are parallelly arranged with their ends interconnected by U-shaped connector tubes 6 to connect all the separation elements 1 together in series.

The separation element 1 comprises a porous backing tube uniformly coated with a semipermeable membrane over the inner surface. The separation element 1 can be produced by various known methods for example, by the method disclosed by S. Loeb in Desalination, 1, 1966.

The separation element has at each end a diametrically enlarged flared portion 11 to provide the seal structure to be described later. FIG. 2 shows a device for forming the enlarged flared portion 11 at the end of the separation element 1. The device comprises a forming iron 21 having a peripheral shape conforming to the shape of the enlarged flared portion 11 and disposed upright in a cylindrical heater 22. A thermocouple 23 detects the temperature of the forming iron 21 to control the heat generation of the heater 22 and maintain the temperature at an optimum level suited to the material of the separation element 1.

The end of the separation element 1 is fitted to and pressed against the forming iron 21 for several seconds, whereby the diametrically enlarged flared portion 11 can be formed. The shape, maximum length and maximum diameter of the enlarged flared portion 11 are suitably determined in accordance with the kind of the material of the separation element. When the enlarged flared portion 11 has an outwardly spreading shape as shown in FIG. 1 for example, the portion 11 has an angle of inclination of 10° to 30° and a length of 4 to 10 mm. When the separation element has a diameter of about 1 inch, the enlarged portion has a maximum diameter of 1.1 to 1.5 inches. If the separation element is made of a thermoplastic material and is sufficiently stiff, the end of the separation element can be diametrically enlarged as desired by being pressed against the forming iron 21. The separation element 1 may be wet or dry when pressed against the forming iron 21, and there is no need to use any lubricant.

It is suitable that the forming iron 21 have a surface temperature which is lower than the melting point of the material of the separation element 1 but is higher than the softening point of the material. If the temperature of the forming iron is higher than the melting point of the semipermeable membrane material, the enlarged portion formed becomes harder and more susceptible to cracking. Precautions should therefore be taken to avoid such objection.

The enlarged flared portion 11 is formed in the following manner, for example. When the separation element comprises a tube of porous polyester nonwoven fabric coated over the inner surface with a semipermeable membrane of polysulfone resin (product of Union Carbide Corporation), the suitable temperature is in the range of 120° to 170° C. A satisfactory enlarged portion 11 can be formed by pressing the end of the separation element against the forming iron 21 for about 10 seconds.

The porous pressure-resistant tube 2 is slightly shorter than the length (about 3 m) of the separation element 1 and has an inside diameter approximately equal to the outside diameter of the separation element. The tube may have any of various known constructions. Examples of useful tubes are pipes made of metal or a thermoplastic resin selected from polyethylene, polyvinyl chloride, polypropylene, polyester, polycarbonate and polyacetal which have a large number of pores in the wall thereof, or porous tubes produced by impregnating a tube of glass fiber fabric with phenolic resin and curing the resin as disclosed in Published Examined Japanese patent application Sho No. 39-30143.

The collector tube 3 is shorter than the porous pressure-resistant tube 2 and has an inside diameter slightly larger than the outside diameter of the porous pressure-resistant tube 2. When the pressure-resistant tube 2 is inserted into the collector tube 3, a narrow annular liquid passage 5 is formed between the two tubes. The liquid passage 5 may have a very small width. When the pressure-resistant tube 2 has an outside diameter of 1 inch, the collector tube 3 may have an inside diameter which is 0.5 mm larger to achieve the desired result. The collector tube 3 has at each end a tapered threaded portion 7 for screw-thread engagement with a joint member 4. The pressure-resistant tube 2 and the separation element 1 are fitted into one end of the joint member 4, and the connector tube 6 is fitted into the other end thereof to hold the separation element 1 in communication with the connector tube 6.

When the joint member is joined to the collector tube 3, the forward end of the pressure resistant tube 2 is fixedly fitted to a bearing face 14 formed on the inside of the joint member 4 to provide a liquid passage between the outer periphery of the pressure-resistant tube 2 and the inner periphery of the joint member 4. The joint member is formed in a side portion thereof with an outlet bore 15 communicating with the liquid passage 5 within the joint for drawing off the filtrate flowing through the passage 5. The joint member 4 and the connector tube 6 can be made from metal, but from the viewpoint of economy and ease of machining, it is preferable to make them from a thermoplastic resin selected from polyethylene, polypropylene, polyvinyl chloride, polystyrene, polycarbonate, polyacetal, etc.

The connector tube 6 has at its end a tapered face 12 having the same inclination as the outwardly spreading enlarged flared portion 11 of the separation element 1. The joint member 4 has inside thereof a tapered face 13 having the same inclination as, and corresponding to, the tapered face of the connector tube 6. When a cap nut 8 is fitted over an annular projection 10 on the outer periphery of the connector tube 6 and screwed on screw threads 9 of the joint member 4, the tapered face 12 at the forward end of the connector tube 6 and the tapered face 13 of the joint member 4 firmly hold the enlarged flared portion 11 of the separation element 1 therebetween to provide a seal. This mode of connection is called "sanitary connection" and is especially desirable for devices for handling liquids, such as food and pharmaceutical products, containing a component susceptible to spoiling or rotting. Although the sanitary connection usually does not require a gasket, it is preferable to cover the tapered portions 12 and 13 with a thin rubber ring or like shock absorbing members 41 and 61 when a semipermeable membrane of low strength must be used for the separation (FIG. 6).

FIG. 3 shows another example of sanitary connection. The connector tube 6 has a vertical end face, and a holding ring 17 having a tapered face is disposed at the tube end with a gasket 16 provided between the ring and the tube end.

FIG. 4 shows another example in which stepped holding faces 18 and 19 are formed at the forward end of the connector tube 6 and on the inner side of the joint member 4 to hold the enlarged portion 11 of the separation element 1 between the faces 18 and 19 for sealing.

FIG. 5 shows a joint member 4 provided in its inner surface with a circumferential flow passage 20 in the form of a deep groove and intersecting the outlet bore 15.

The liquid passing through the membrane flows through the passage 5 in the collector tube 3 axially of the tube, reaches the joint member 4, then flows through the enlarged passage 20 circumferentially thereof and runs out from the outlet bore 15. Thus the filtrate can be drawn off from the tube smoothly.

The apparatus of this invention will be assembled usually in the following manner. First, the porous pressure-resistant tube 2 is placed into the liquid collector tube 3, and the joint members 4 are attached to opposite ends of the collector tube 3. Next, one of the diametrically enlarged flared portions 11 formed at opposite ends of the separation element 1 is slightly deformed inward by pressing and pushed into the pressure-resistant tube 2 through one of the joint members. When the separation element has been completely pushed in with the other end of the separation element reaching the tapered face 13 of the joint member 4, both ends of the separation element 1 are on the tapered faces 13 of both joint members. The slightly inwardly deformed enlarged portion 11 is then restored to the original outwardly spreading position by stroking with a finger inserted into the joint member 4 through its opening. Finally the connector tubes 6 are inserted into the joint members, and the cap nuts 8 are fully tightened up to seal the enlarged portions 11, whereby the apparatus is completely assembled.

The separation element 1 can be withdrawn by a reverse procedure.

With the apparatus of this invention, the membrane can be replaced easily and inexpensively. Without the gasket of special shape conventionally used, the apparatus does not involve sanitation problems, while it is easy to clean because the parts are separable. Thus the apparatus is free of the problems conventionally experienced.

INDUSTRIAL APPLICABILITY

The tubular membrane separation apparatus of this invention is useful for the ultrafiltration and reverse osmosis of aqueous solutions of high-molecular-weight materials and colloidal solutions for preparing foods, drugs, coating compositions, etc.

We claim:

1. A tubular membrane separation apparatus including a separation element (1) having a tubular porous backing member with an inner surface and a semipermeable membrane formed over the inner surface of the backing member having an inside diameter, and a porous pressure-resistant tube (2) having the separation element (1) inserted therein, the apparatus being characterized by a liquid collector tube (3) having an inside diameter slightly larger than the outside diameter of the pressure-resistant tube (2) and fitting around the pressure-resistant tube (2) to provide a narrow liquid passage (5) between the collector tube (3) and the pressure-resistant tube (2), a pair of joint members (4) detachably attached at one end of each member to each end of the collector tube (3) and supporting the end of the pressure-resistant tube (2), each joint member having an inner surface and being formed in a side portion thereof with an outlet bore (15) communicating with the liquid passage (5), the separation element (1) being detachably inserted into the pressure-resistant tube (2) projecting outwardly at its end from the end opening of the pressure-resistant tube (2) and being provided at its ends with diametrically enlarged end portions (11) respectively disposed within one of the joint members (4), a pair of connector tubes (6) inserted in the joint members (4) at the other ends thereof and detachably joined to the joint members (4), each connector tube (6) having an inside diameter approximately equal to that of the semipermeable membrane and each enlarged portion (11) of the separation element (1) being solely frustoconically tapered and spread outward toward its outer extremity, and the inner surface of each joint member (4) and the inserted end of each respective connector tube (6) being provided with frustoconically tapered faces (12) and (13) having the same taper as each enlarged portion (11) of the separation element (1), the enlarged portions (11) of the separation element (1) being sealingly held against the tapered faces (12) and (13) of the joint member (4) and the connector tube (6) at each end thereof.

2. A tubular membrane separation apparatus including a separation element (1) having a tubular porous backing member with an inner surface and a semipermeable membrane formed over the inner surface of the backing member having an inside diameter, and a porous pressure-resistant tube (2) having the separation element (1) inserted therein, the apparatus being characterized by a liquid collector tube (3) having an inside diameter slightly larger than the outside diameter of the pressure-resistant tube (2) and fitting around the pressure-resistant tube (2) to provide a narrow liquid passage (5) between the collector tube (3) and the pressure-resistant tube (2), a pair of joint members (4) detachably attached at one end of each member to each end of the collector tube (3) and supporting the end of the pressure-resistant tube (2), each joint member having an inner surface and being formed in a side portion thereof with an outlet bore (15) communicating with the liquid passage (5), the separation element (1) being detachably inserted into the pressure-resistant tube (2) projecting outwardly at its end from the end opening of the pressure-resistant tube (2) and being provided at its ends with diametrically enlarged end portions (11) respectively disposed within one of the joint members (4), a pair of connector tubes (6) inserted in the joint members (4) at the other ends thereof and detachably joined to the joint members (4), each connector tube (6) having an inside diameter approximately equal to that of the semipermeable membrane and the enlarged portions (11) of the separation element (1) being tapered, and a holding ring (17) having an inside diameter approximately equal to that of the semipermeable membrane and an outer peripheral frustoconically tapered face inserted into each joint member (4) from the opening of the other end thereof, a gasket (16) being provided between each holding ring (17) and the inserted end of each connector tube (6), the enlarged portions (11) of the separation element (1) being sealingly held against the holding ring (17) and a tapered face (13) of the joint member (4) at each end thereof.

3. A tubular membrane separation apparatus as defined in claim 1 wherein the inner surface of each joint member (4) and the inserted end of the connector tube (6) are covered with a thin shock absorbing member to hold the enlarged portion (11) of the separation element (1) therebetween.

4. A tubular membrane separation apparatus as defined in claim 1 wherein the joint member (4) is formed in its inner surface with a deep circumferential flow passage (20) intersecting the outlet bore (15).

5. A tubular membrane separation apparatus as defined in claim 1 wherein a cap nut (8) is fitted over an annular projection (10) on the outer periphery of an end portion of the connector tube (6) and is detachably joined to a threaded face (9) formed on the outer periphery of an end portion of the joint member (4) to draw the connector tube (6) into the joint member (4) and hold the enlarged portion (11) of the separation element (1) between the inner surface of the joint member (4) and the connector tube (6).

* * * * *